United States Patent
Kim et al.

(10) Patent No.: US 10,897,382 B2
(45) Date of Patent: Jan. 19, 2021

(54) PULSE AMPLITUDE MODULATION-3 TRANSCEIVER AND OPERATION METHOD THEREOF

(71) Applicant: Korea University Research and Business Foundation, Seoul (KR)

(72) Inventors: Chulwoo Kim, Seoul (KR); Hyunsu Park, Seoul (KR); Jin Cheol Sim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 16/454,307

(22) Filed: Jun. 27, 2019

(65) Prior Publication Data
US 2020/0007362 A1  Jan. 2, 2020

(30) Foreign Application Priority Data

Jun. 27, 2018 (KR) .......................... 10-2018-0073850
Feb. 14, 2019 (KR) .......................... 10-2019-0017166
Mar. 12, 2019 (KR) .......................... 10-2019-0027914

(51) Int. Cl.
*H04L 25/49* (2006.01)
(52) U.S. Cl.
CPC ................................. *H04L 25/4917* (2013.01)
(58) Field of Classification Search
CPC . H04L 25/4917; H04B 14/023; H04B 14/004; H04Q 2213/1303; H03K 7/02
See application file for complete search history.

(56) References Cited

U.S. PATENT DOCUMENTS 8,121,205 B1 * 2/2012 Zheng ................... H04L 25/497
375/260
8,750,406 B2  6/2014 Pan et al.
(Continued)

FOREIGN PATENT DOCUMENTS

JP           6293924 B2     3/2018
KR     10-1802791 B1    11/2017
(Continued)

OTHER PUBLICATIONS

Ha, Kyung-Soo et al., "A 7.5Gb/s/pin LPDDR5 SDRAM with WCK Clocking and Non-Target ODT for High Speed and with DVFS, Internal DataCopy, and Deep-Sleep Mode For Low Power", *2019 IEEE International Solid-State Circuits Conference*, Feb. 20, 2019 (3 pages in English).
(Continued)

*Primary Examiner* — Sophia Vlahos
(74) *Attorney, Agent, or Firm* — NSIP Law

(57) ABSTRACT

According to an embodiment of the inventive concept, a device for PAM-3 signaling includes an encoder selecting one of first to ninth transitions in first and second unit intervals that are successive and mapping data of three bits by using a remaining eight transitions other than the one selected among the first to ninth transitions, and an output driver receiving an output signal of the encoder via an input and generating a multi-level signal having an output voltage of first to third levels. The data of three bits is transmitted to a receiver terminal through the multi-level signal having the output voltage of the first to third levels during the first and second unit intervals that are successive. The device for PAM-3 signaling according to an embodiment of the inventive concept may transmit three bits during two unit intervals and may allow a receiver terminal to detect a windowing phenomenon.

14 Claims, 17 Drawing Sheets

(56) References Cited

U.S. PATENT DOCUMENTS

| 10,439,661 | B1* | 10/2019 | Heydari | H04L 27/36 |
|---|---|---|---|---|
| 2013/0195155 | A1* | 8/2013 | Pan | H04L 25/066 |
| | | | | 375/219 |
| 2018/0109318 | A1 | 4/2018 | Castro et al. | |
| 2019/0089466 | A1* | 3/2019 | Li | H04B 10/6931 |
| 2020/0007155 | A1* | 1/2020 | Cornelius | H03M 5/16 |

FOREIGN PATENT DOCUMENTS

| KR | 10-2018-0015446 A | 2/2018 |
|---|---|---|
| KR | 10-2018-0087472 A | 8/2018 |

OTHER PUBLICATIONS

Kim, Dongkyun et al., "A 1.1V 1ynm 6.4Gb/s/pin 16Gb DDR5 SDRAM with a Phase-Rotator-Based DLL, HighSpeed SerDes and RX/TX Equalization Scheme", *2019 IEEE International Solid-State Circuits Conference*, Feb. 20, 2019 (3 pages in English).

Lee, Seongju et al., "A 512GB 1.1V Managed DRAM Solution with 16GB ODP and Media Controller", *2019 IEEE International Solid-State Circuits Conference*, Feb. 20, 2019 (3 pages in English).

Park, Hyunsu et al., "A 3-bit/2UI 27Gb/s PAM-3 Single-Ended Transceiver Using One-Tap DFE for Next-Generation Memory Interface", *2019 IEEE International Solid-State Circuits Conference*, Feb. 20, 2019 (3 pages in English).

\* cited by examiner

[FIG. 1]
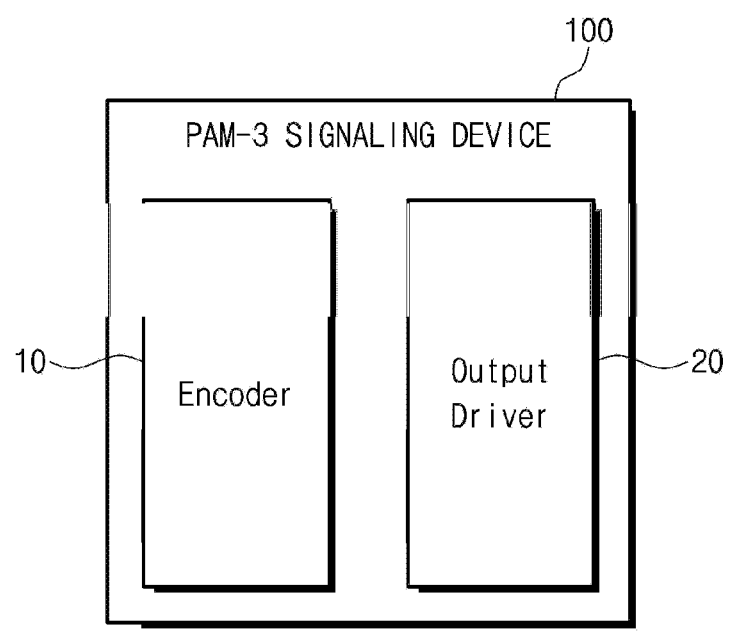

【FIG. 2A】

| Input Data A B C | Transitions |
|---|---|
| Not Assigned | |
| 0  1  1 | |
| 1  1  1 | |
| 0  1  0 | |
| 0  0  0 | |
| 0  0  1 | |
| 1  1  0 | |
| 1  0  0 | |
| 1  0  1 | |

【FIG. 2B】

| Input Data A B C | Transitions |
|---|---|
| 0  0  0 | |
| 0  0  1 | |
| 0  1  1 | |
| 1  0  0 | |
| 1  0  1 | |
| 1  1  1 | |
| Not Assigned | |
| 0  1  0 | |
| 1  1  0 | |

[FIG. 2C]
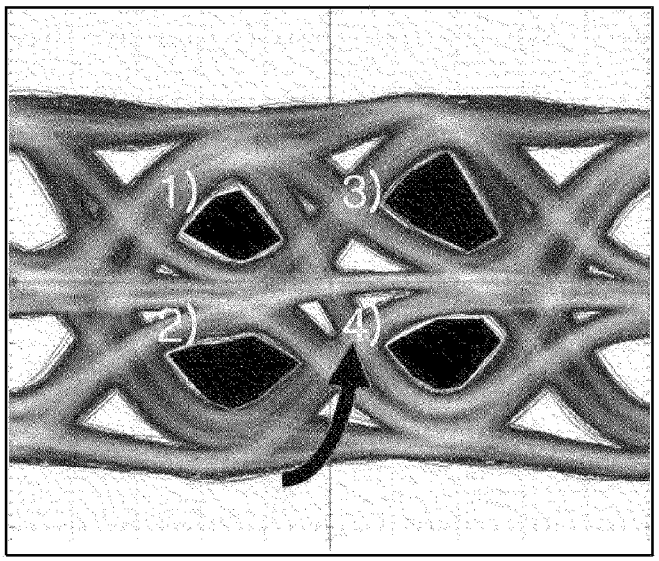
[FIG. 3]
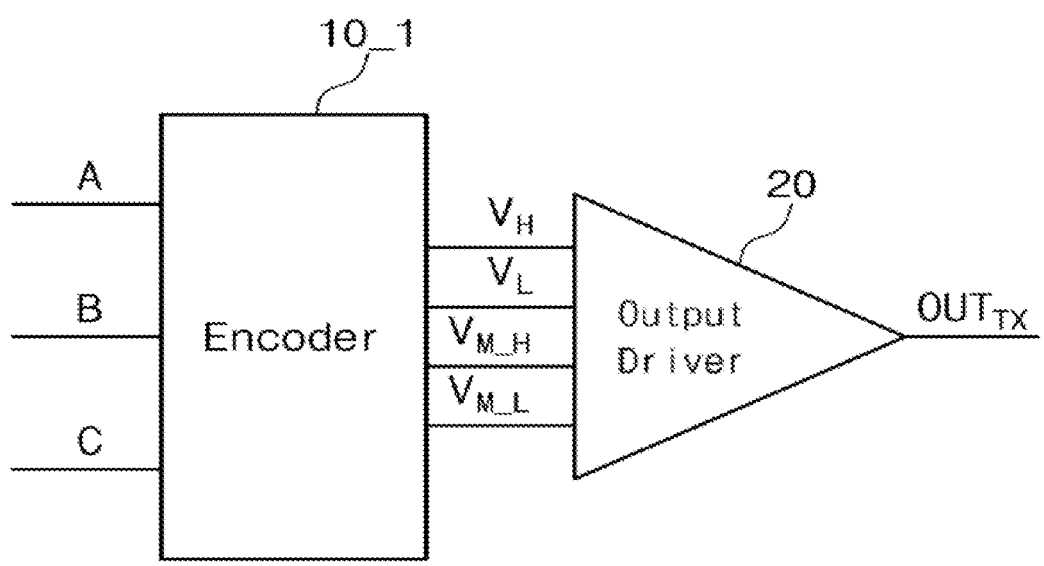

[FIG. 4A]
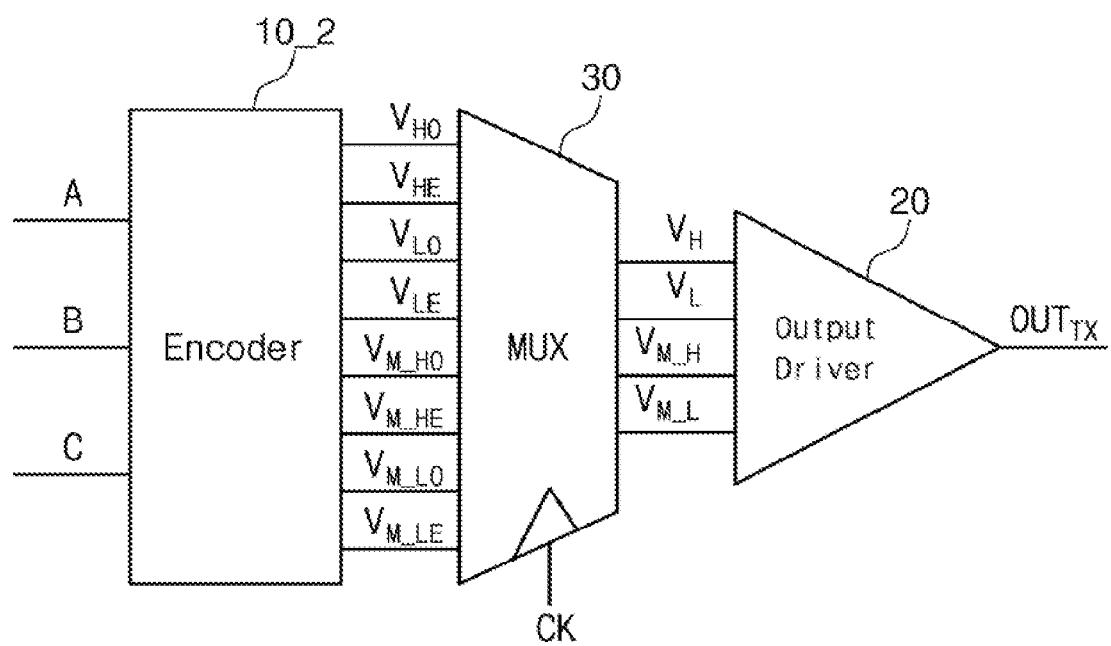

[FIG. 4B]

| Input Data | | | Encoder Data(ODD) | | | | Encoder Data(EVEN) | | | | TX Output (ODD+EVEN) |
|---|---|---|---|---|---|---|---|---|---|---|---|
| A | B | C | $V_{HO}$ | $V_{LO}$ | $V_{M\_HO}$ | $V_{M\_LO}$ | $V_{HE}$ | $V_{LE}$ | $V_{M\_HE}$ | $V_{M\_LE}$ | |
| Not Assigned | | | Not Assigned | | | | Not Assigned | | | | |
| 0 | 1 | 1 | 1 | 0 | 1 | 0 | 0 | 0 | 1 | 1 | |
| 1 | 1 | 1 | 1 | 0 | 1 | 0 | 0 | 1 | 0 | 1 | |
| 0 | 1 | 0 | 0 | 0 | 1 | 1 | 1 | 0 | 1 | 0 | |
| 0 | 0 | 0 | 0 | 0 | 1 | 1 | 0 | 0 | 1 | 1 | |
| 0 | 0 | 1 | 0 | 0 | 1 | 1 | 0 | 1 | 0 | 1 | |
| 1 | 1 | 0 | 0 | 1 | 0 | 1 | 1 | 0 | 1 | 0 | |
| 1 | 0 | 0 | 0 | 1 | 0 | 1 | 0 | 0 | 1 | 1 | |
| 1 | 0 | 1 | 0 | 1 | 0 | 1 | 0 | 1 | 0 | 1 | |

【FIG. 5A】
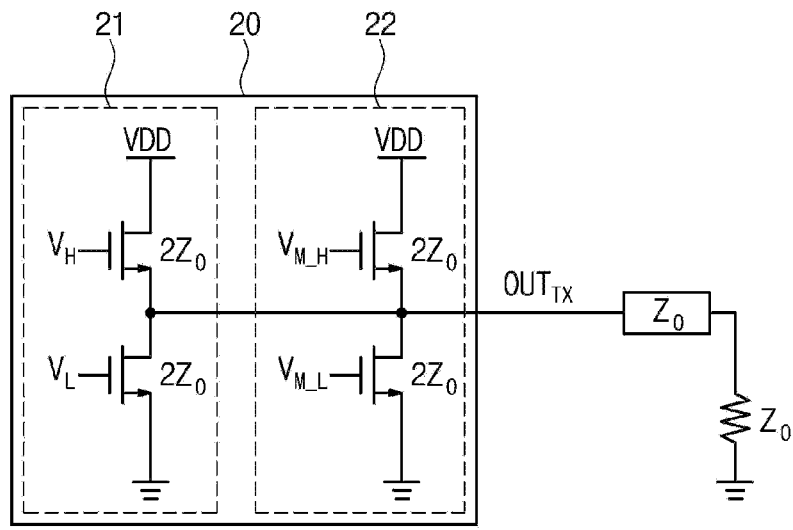
【FIG. 5B】
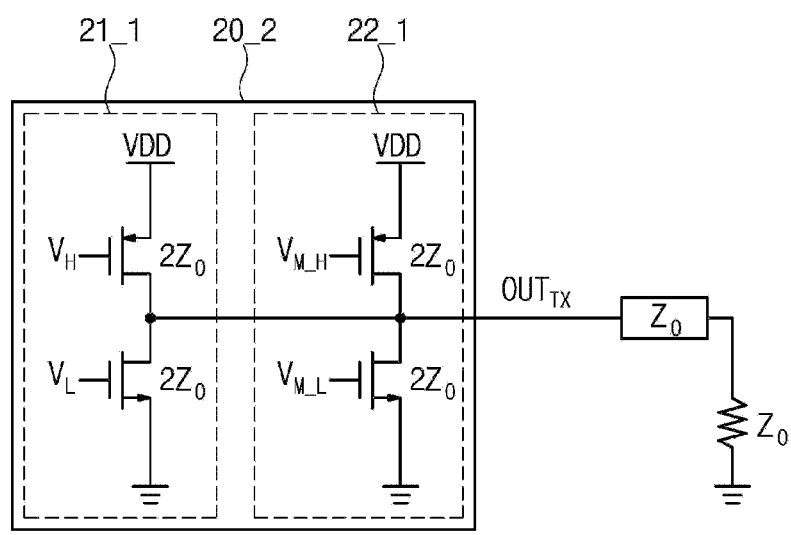

[FIG. 6]

| $V_H$ | $V_L$ | $V_{M\_H}$ | $V_{M\_L}$ | $OUT_{TX}$ |
|---|---|---|---|---|
| 1 | 0 | 1 | 0 | 0.5VDD |
| 0 | 0 | 1 | 1 | 0.25VDD |
| 0 | 1 | 0 | 1 | 0 |

[FIG. 7]
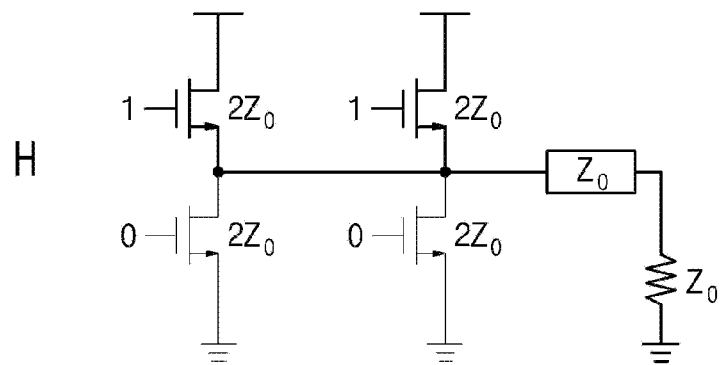
H
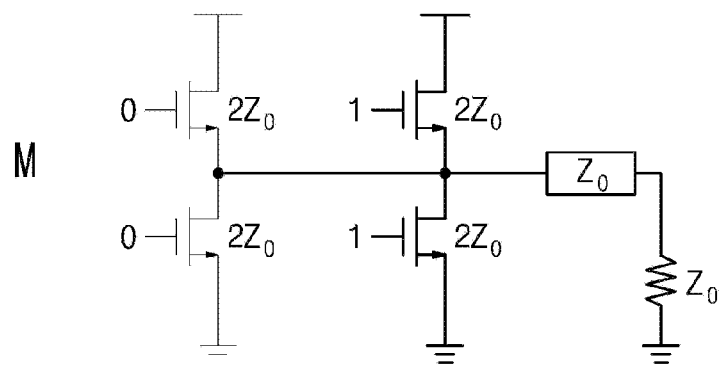
M
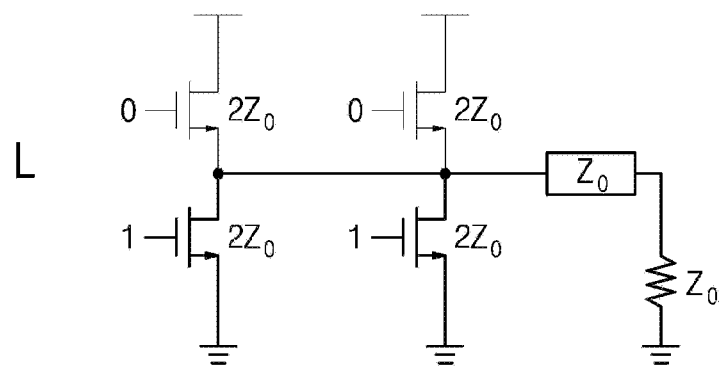
L

[FIG. 8]
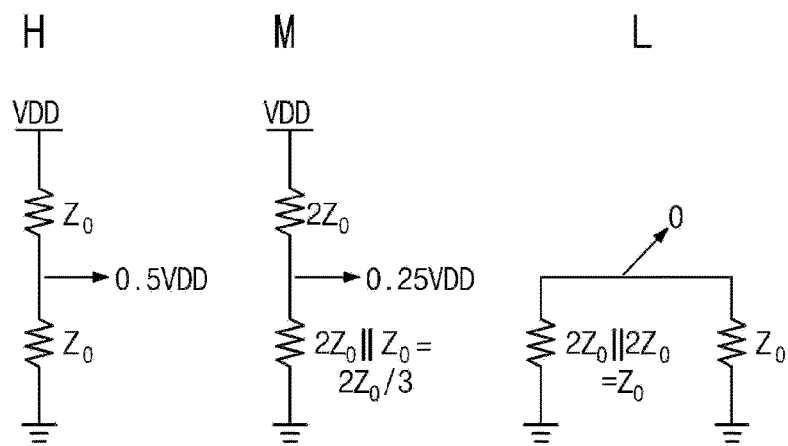
[FIG. 9]
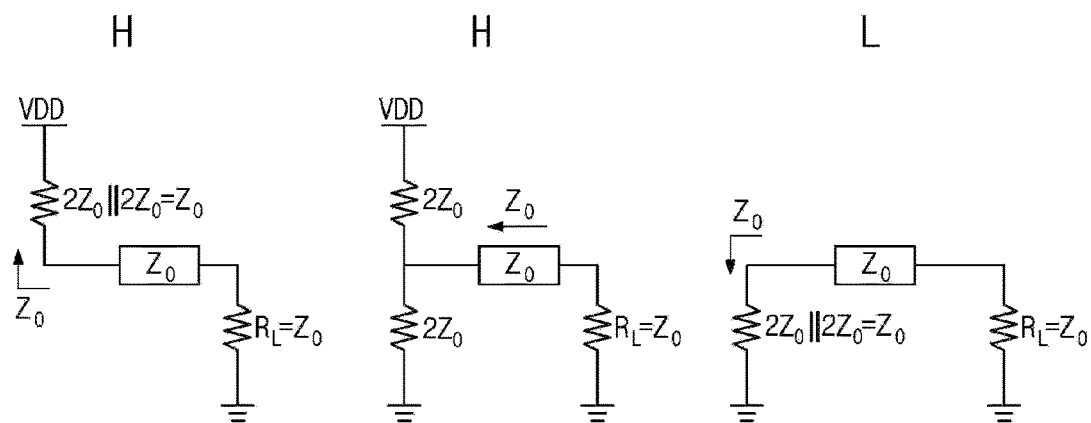

【FIG. 10】
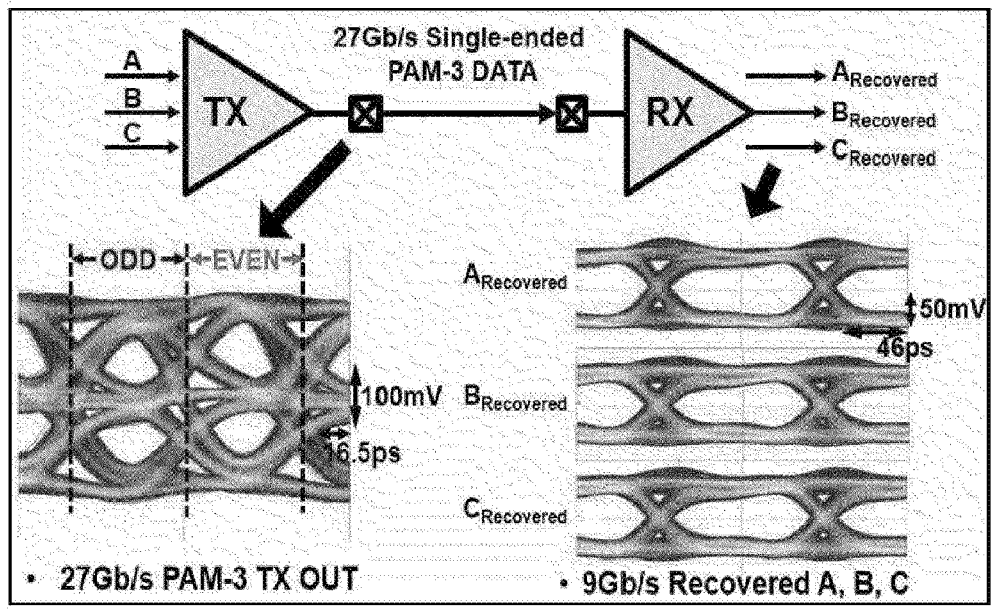
【FIG. 11A】
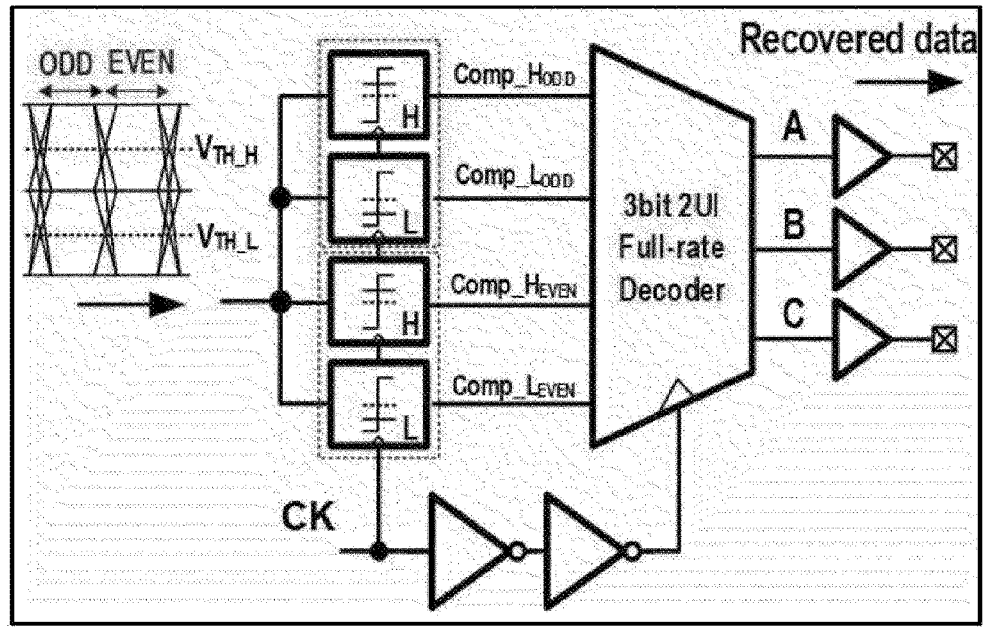

【FIG. 11B】
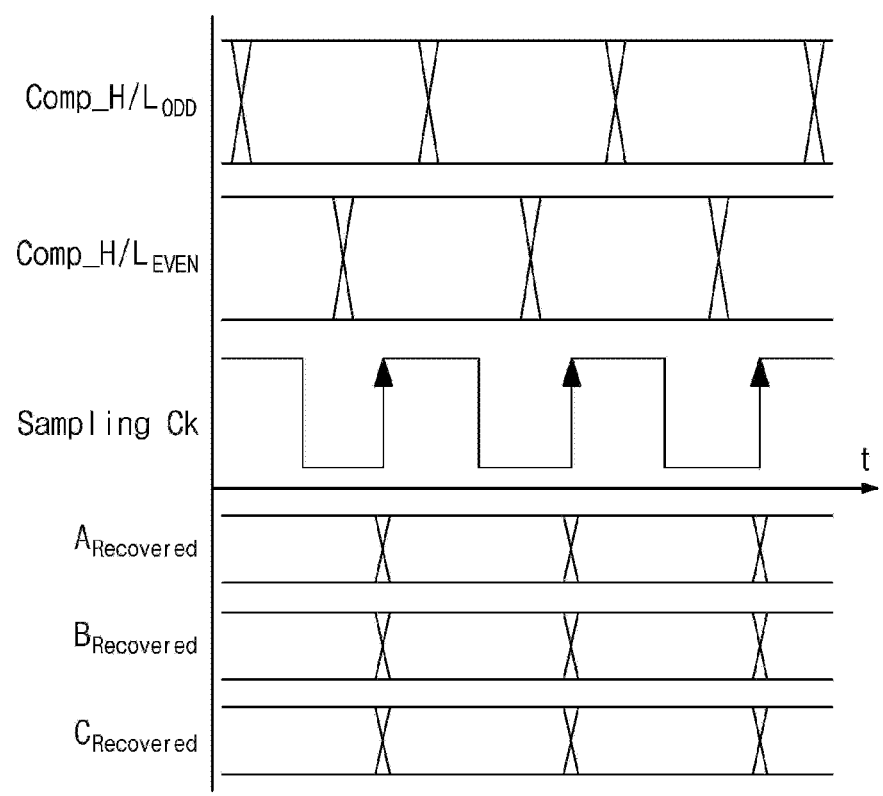

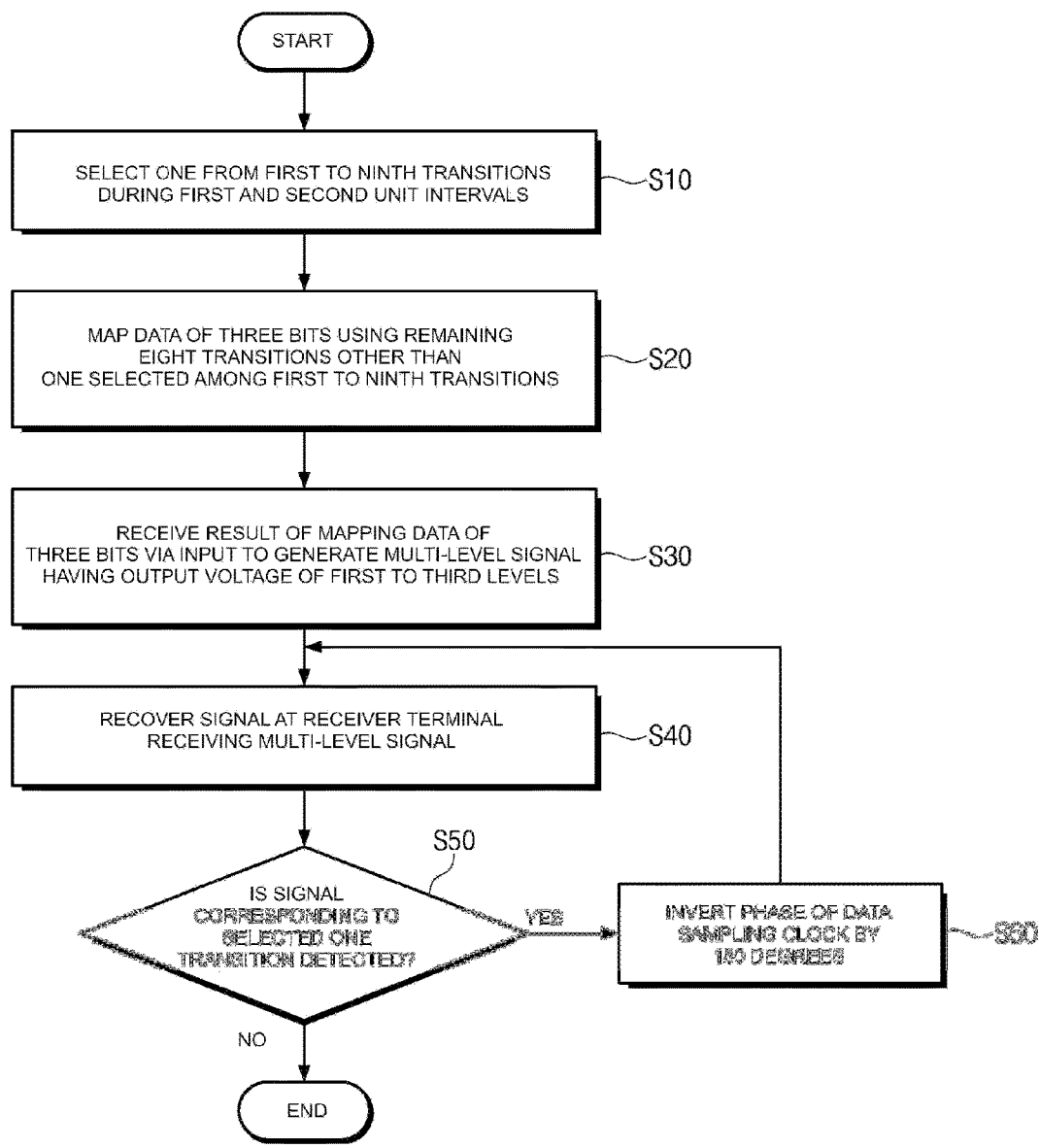
[FIG. 12]

[FIG. 13]
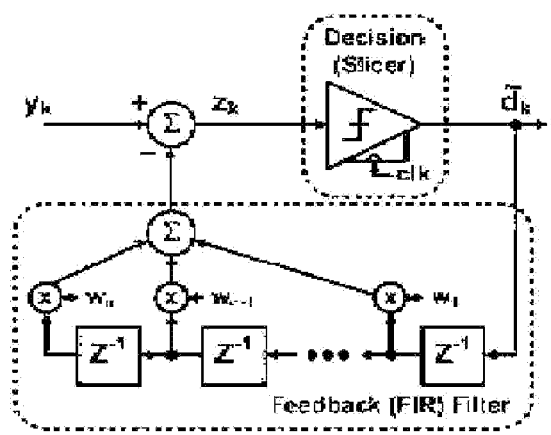
[FIG. 14]
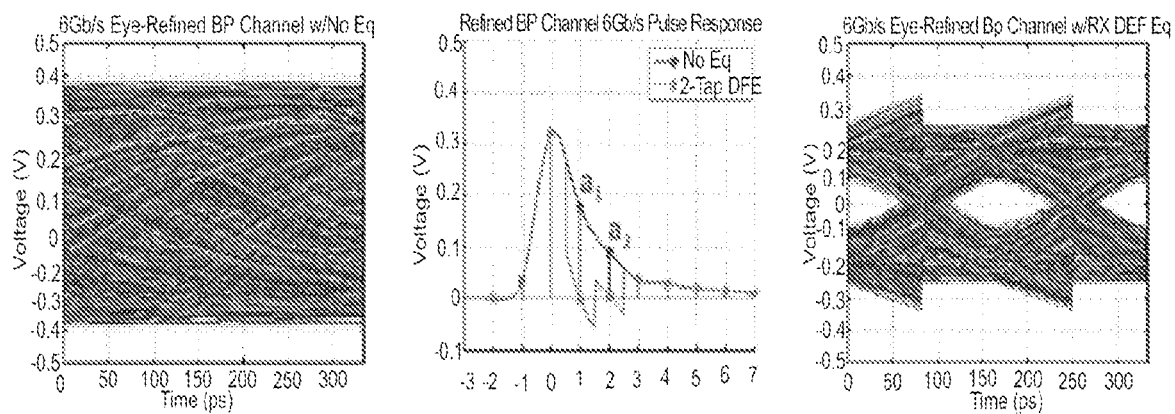

[FIG. 15]
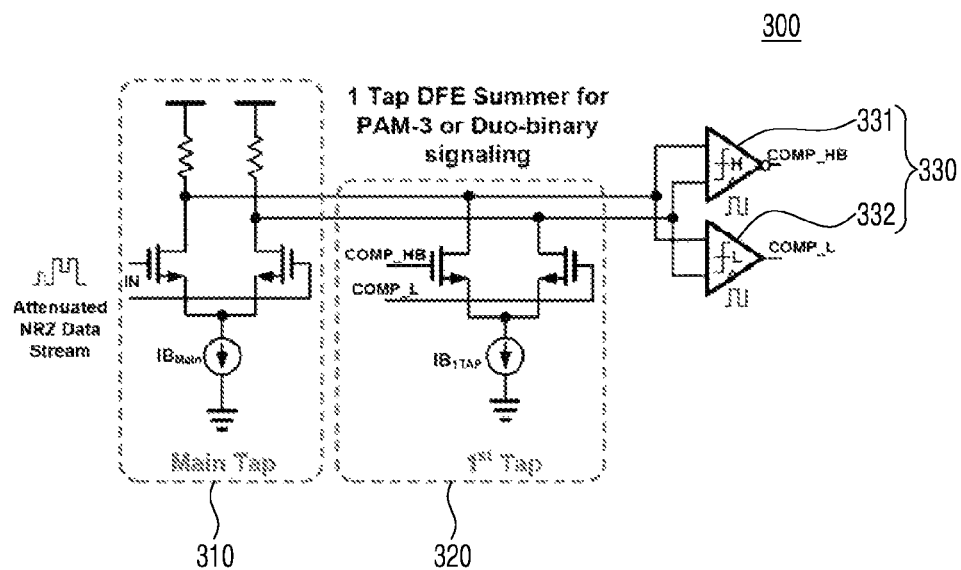
[FIG. 16]
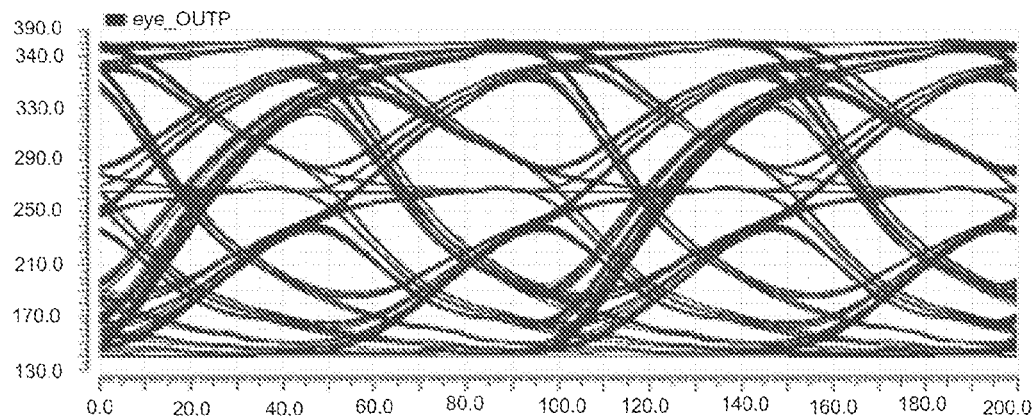

[FIG. 17]
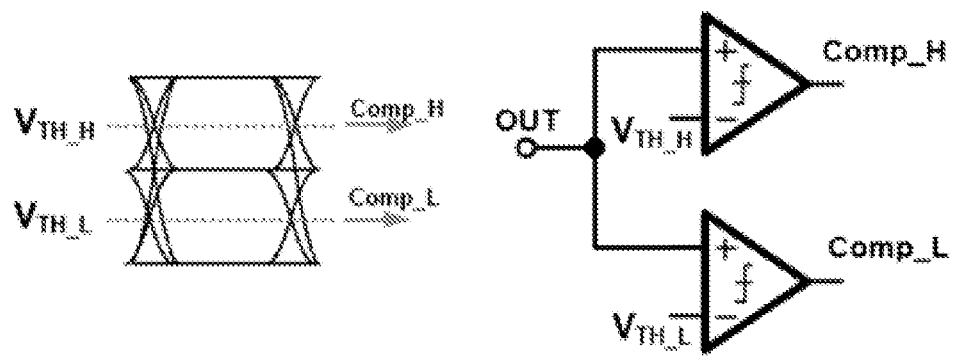
[FIG. 18]
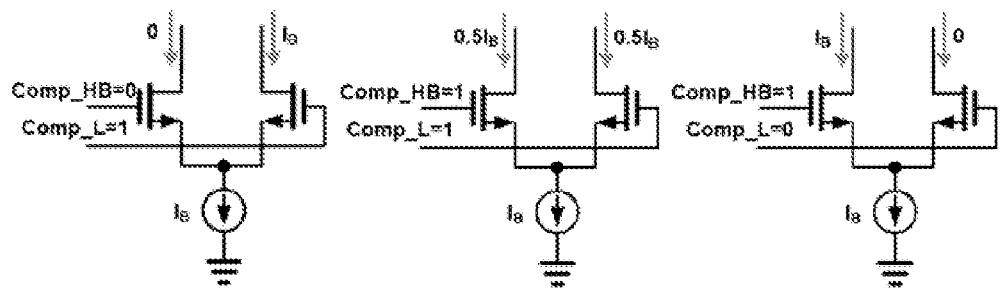
[FIG. 19]
| Input Data | Comparator Output | | Feedback Data | | Subtracted Current |
|---|---|---|---|---|---|
| High | Comp_H | 1 | Comp_HB | 0 | $I_S$ |
| | Comp_L | 1 | Comp_L | 1 | |
| Middle | Comp_H | 0 | Comp_HB | 1 | $0.5I_S$ |
| | Comp_L | 1 | Comp_L | 1 | |
| Low | Comp_H | 0 | Comp_HB | 1 | 0 |
| | Comp_L | 0 | Comp_L | 0 | |

[FIG. 20]
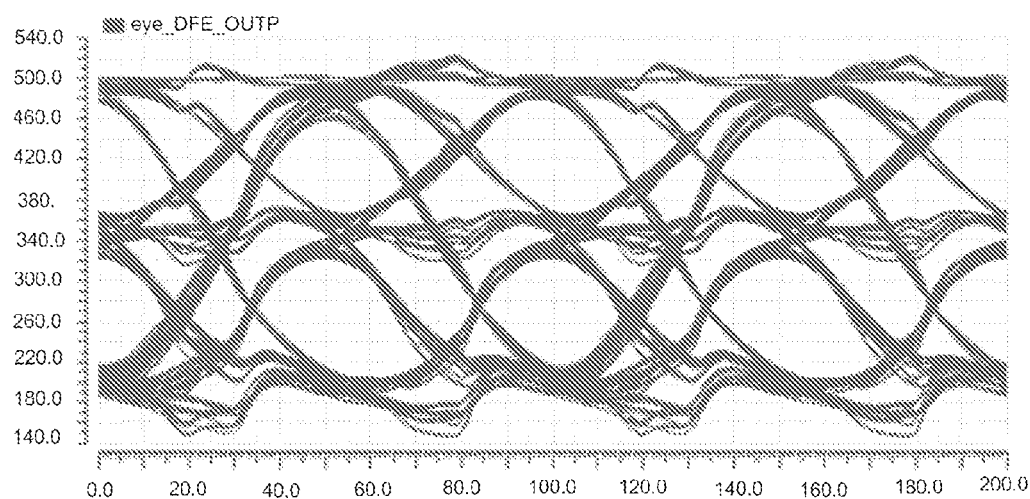

PULSE AMPLITUDE MODULATION-3 TRANSCEIVER AND OPERATION METHOD THEREOF

CROSS REFERENCE TO RELATED APPLICATIONS

This application claims priority under 35 U.S.C. § 119 to Korean Patent Application No. 10-2018-0073850 filed on Jun. 27, 2018, Korean Patent Application No. 10-2019-0017166 filed on Feb. 14, 2019 and Korean Patent Application No. 10-2019-0027914 filed on Mar. 12, 2019 in the Korean Intellectual Property Office, the disclosures of which are incorporated by reference herein in their entireties.

BACKGROUND

Embodiments of the inventive concept described herein relate to the design of a high-speed transceiver, and more particularly, relate to a pulse amplitude modulation-3 transceiver for multi-level pulse amplitude modulation signaling, and an operation method thereof.

Generally, the PULSE AMPLITUDE MODULATION-2 (PAM-2) signaling having two data modulation levels may be used for data communication. The conventional PAM-2 signaling may make it possible to simplify the structure of a transceiver. However, only one bit may be transmitted during one unit interval (UI), and the clock frequency needs to increase to increase bandwidth. For this reason, this may cause channel attenuation and deterioration of clock quality. An additional circuit and power consumption are required to improve the clock quality. A complex equalizer circuit such as continuous time linear equalizer (CTLE), decision feedback equalizer (DFB), or the like is required at a receiver to compensate for the channel attenuation.

As such, duo-binary signaling such as PAM-2 may be used to reduce the effect of the channel attenuation using three data modulation levels even though one bit is transmitted during one UI. Because the duo-binary signaling stores information about the transition of data, not data in one data modulation level, the low-to-high or high-to-low transition is not present. Accordingly, clean signal quality may be ensured in the case of channel attenuation. However, compared with the PAM-2 signaling, the same clock frequency needs to be used and there is no gain in bandwidth.

Accordingly, PAM-N may be used to increase the bandwidth.

PULSE AMPLITUDE MODULATION-4 (PAM-4) signaling may transmit two bits during one UI. However, in terms of single-ended signaling, the sensing margin of the PAM-4 signaling is very small, and the PAM-4 signaling is very sensitive to the supply voltage noise and the linearity of a signal is very low. Accordingly, the feasibility of the PAM-4 signaling may be low.

PULSE AMPLITUDE MODULATION-3 (PAM-3) signaling refers to signaling that transmits three voltage levels at a time, and may theoretically transmit 1.5 bits ($\log_2 3 \doteq 1.56$). However, the PAM-3 signaling has structural inefficiency. The PAM-3 interface may not encode two bits in one UI, and it is difficult for an output driver to maintain impedance matching for all inputs. Accordingly, the study on an efficient encoding method and the design of the output driver is required to solve this problem.

SUMMARY

Embodiments of the inventive concept provide a PAM-3 transceiver capable of efficiently transmitting three bits during two UIs, and an operation method thereof.

The additional purpose of the inventive concept is to provide a PAM-3 transceiver capable of expressing three data modulation levels while the complexity of a circuit is reduced, and an operation method thereof.

According to an exemplary embodiment, a PAM-3 signaling device includes an encoder selecting one of first to ninth transitions in first and second unit intervals that are successive and mapping data of three bits by using a remaining eight transitions other than the one selected among the first to ninth transitions, and an output driver receiving an output signal of the encoder via an input and generating a multi-level signal having an output voltage of first to third levels. The data of three bits is transmitted to a receiver terminal through the multi-level signal having the output voltage of the first to third levels during the first and second unit intervals that are successive.

In an embodiment, the one selected among the first to ninth transitions is used to detect a windowing phenomenon at the receiver terminal receiving the multi-level signal.

In an embodiment, the encoder selects the one of the first to ninth transitions, based on at least one of circuit characteristics of the output driver, characteristics of a channel through which the multi-level signal is transmitted, and a pattern of the data of three bits.

In an embodiment, the output voltage of the first to third levels of the multi-level signal correspond to a low level, a middle level, and a high level, respectively, and the first to ninth transitions are made using combination of the first to third levels in the first unit interval and the first to third levels in the second unit interval.

In an embodiment, the encoder is configured to select one transition from a first level in the first unit interval to a third level in the second unit interval among the first to ninth transitions and to map the data of three bits, using the remaining eight transitions.

In an embodiment, the encoder is configured to select one transition in a case of a third level during both the first and second unit intervals among the first to ninth transitions and to map the data of three bits, using the remaining eight transitions.

In an embodiment, the encoder is configured to output the mapped result to first to fourth driver signal lines after mapping the data of three bits by using the remaining eight transitions other than the selected one. The output driver is configured to generate the multi-level signal having the output voltage of the first to third levels, based on a signal input from the first to fourth driver signal lines.

In an embodiment, the device further includes a multiplexer electrically connected to the encoder and the output driver. The encoder is configured to output the mapped result to the multiplexer via the first to fourth driver signal lines after mapping the data of three bits by using the remaining eight transitions other than the selected one. The multiplexer selectively outputs four of the first to eighth signal lines at a half rate, as the first to fourth driver signal lines connected to the output driver, and the output driver is configured to generate the multi-level signal having the output voltage of the first to third levels, based on a signal input from the first to fourth driver signal lines of the multiplexer.

In an embodiment, the output driver includes a first stage circuit unit including a first transistor electrically connecting between a power supply and an output terminal in response to a signal of the first driver signal line and a second transistor electrically connecting between the output terminal and a ground in response to a signal of the second driver signal line and a second stage circuit unit including a third transistor electrically connecting between the power supply and the output terminal in response to a signal of the third driver signal line and a fourth transistor electrically connecting between the output terminal and the ground in response to a signal of the fourth driver signal line. The first stage circuit unit and the second stage circuit unit are connected via the output terminal.

In an embodiment, all turn-on resistors of the first to fourth transistors are $2Z_O$. $Z_O$ is characteristic impedance of a channel through which the multi-level signal is transmitted. Impedance at a point in time when the output terminal of the output driver is viewed from the channel identically remains as $Z_O$ in the output driver, under all input conditions of a signal input from the first to fourth driver signal lines.

In an embodiment, the multi-level signal is recovered to an original 3-bit signal at the receiver terminal through decoding logic of four half-rate reference comparators and a decoder.

In an embodiment, the receiver terminal determines that a windowing phenomenon occurs when a signal corresponding to the one transition selected among the first to ninth transitions is detect.

In an embodiment, the receiver terminal inverts sampling clock phases of the four comparators and the decoder by 180 degrees when a signal having the one transition selected among the first to ninth transitions is detected.

According to an exemplary embodiment, a PAM-3 signaling method includes selecting, by an encoder, one of first to ninth transitions in first and second unit intervals that are successive, mapping, by the encoder, data of three bits by using a remaining eight transitions other than the one selected among the first to ninth transitions, and receiving, by an output driver, a result of mapping the data of three bits via an input to generate a multi-level signal having an output voltage of first to third levels. The data of three bits is transmitted to a receiver terminal through the multi-level signal having the output voltage of the first to third levels during the first and second unit intervals that are successive.

According to an exemplary embodiment, a decision feedback equalizer circuit for PAM-3, or duo-binary signaling includes a main tap circuit unit receiving an input signal, a two-stage comparator including a first comparator for comparison with a first reference value and a second comparator for comparison with the first reference value, and a first tap circuit unit. The first tap circuit unit is configured to apply an output value of the three levels of the two-stage comparator to an input, to remove a post-cursor based on the applied output value of the three levels of the two-stage comparator, and to apply a value in which the post-cursor is removed, to an input of the two-stage comparator. An output value of the two-stage comparator is divided into three levels depending on the input signal.

In an embodiment, the output value of the three levels of the two-stage comparator includes an output value of the first comparator and an output value of the second comparator.

In an embodiment, the first comparator performs comparison with an upper reference value, and the second comparator performs comparison with a lower reference value, and the output value of the first comparator is COMP_HB that is a BAR value of COMP_H, and the output value of the second comparator is COMP_L.

In an embodiment, the first tap circuit unit is configured to generate three compensation current values respectively corresponding to the output value of the three levels, using a single tail current source $I_B$.

In an embodiment, the compensation current value is $0.5I_B$ when the COMP_HB is '1' and the COMP_L is '1'.

BRIEF DESCRIPTION OF THE FIGURES

The above and other objects and features of the inventive concept will become apparent by describing in detail exemplary embodiments thereof with reference to the accompanying drawings.

FIG. 1 is a block diagram illustrating a PAM-3 signaling device 100, according to an embodiment of the inventive concept;

FIGS. 2A and 2B are views illustrating an example of input data of the encoder 10 and the transition mapping result according to the input data, according to an embodiment of the inventive concept;

FIG. 2C is an eye-diagram of PAM-3 data associated with the embodiment of FIG. 2B;

FIG. 3 is a view for describing an encoder 10_1 and an output driver 20, according to an embodiment of the inventive concept;

FIG. 4A is a view for describing an encoder 10_2 and an output driver 20, according to an embodiment of the inventive concept;

FIG. 4B is a view for describing data mapping of the encoder 10_2, according to an embodiment of the inventive concept;

FIGS. 5A and 5B are views illustrating a circuit of the output driver 20, according to an embodiment of the inventive concept;

FIG. 6 is a view illustrating an output voltage according to an input of the output driver 20, according to an embodiment;

FIG. 7 is a view for describing an operation of the output driver 20 according to an input;

FIG. 8 is a view for describing voltage distribution of the output driver 20 according to an input;

FIG. 9 is a view illustrating impedance matching of the output driver 20;

FIG. 10 is a view illustrating how a multi-level signal generated by the PAM-3 signaling device 100 is recovered at a receiver terminal, according to an embodiment of the inventive concept;

FIGS. 11A and 11B are views for describing how a windowing phenomenon is solved at a receiver terminal;

FIG. 12 is a flowchart illustrating a PAM-3 signaling method, according to an embodiment of the inventive concept;

FIG. 13 illustrates the structure of a general decision feedback equalizer (DFE);

FIG. 14 is a view for describing the channel attenuation compensation effect of DFE;

FIG. 15 illustrates a DFE circuit associated with another embodiment of the inventive concept;

FIG. 16 is an eye-diagram of PAM-3 data in which a high-frequency component input to a DFE circuit associated with another embodiment of the inventive concept is attenuated;

FIG. 17 is a view for describing the boundary voltage of the PAM-3 signal associated with another embodiment of the inventive concept and the digital output of a two-stage comparator;

FIG. 18 is a view for describing an operation according to an input value of a DFE circuit associated with another embodiment of the inventive concept;

FIG. 19 is a table for describing an operation of a DFE circuit according to an output value of a comparator associated with another embodiment of the inventive concept; and FIG. 20 illustrates an eye-diagram in which PAM-3 data where a channel is attenuated is compensated through a DFE circuit associated with another embodiment of the inventive concept.

DETAILED DESCRIPTION

With regard to various embodiments according to the inventive concept disclosed in this specification, specific structural or functional descriptions are exemplified only for the purpose of describing embodiments according to the inventive concept, and the embodiments according to the inventive concept may be implemented in various different forms, not limiting the embodiments described in this specification.

While the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the invention is to cover all modifications, equivalents, and alternatives falling within the spirit and scope of the inventive concept.

It will be understood that, even though the terms "first," "second," "A," "B," etc. may be used herein in reference to elements of the inventive concept, and such elements should not be construed as being limited by these terms. These terms are only used to distinguish one element from another. For example, a first element could be termed a second element, and, similarly, a second element could be termed a first element, without departing from the scope of the inventive concept.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the inventive concept is not intended to limit the scope of the inventive concept. The articles "a," "an," and "the" are singular in that they have a single referent, however, the use of the singular form in the present document should not preclude the presence of more than one referent. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein have the same meaning as commonly understood by one of ordinary skill in the art to which the inventive concept belongs. It will be further understood that terms used herein should be interpreted as having a meaning that is consistent with their meaning in the context of the inventive concept and the relevant art and will not be interpreted in an idealized or overly formal sense unless expressly so defined herein.

The PAM-3 transceiver according to an embodiment of the inventive concept may refer to a device including the device 100 for single-ended PAM-3 signaling and a decision feedback equalizer circuit 300 for PAM-3 or duo-binary signaling.

Hereinafter, with reference to the accompanying drawings, the inventive concept will be described in detail by sequentially describing embodiments associated with the device 100 for single-ended PAM-3 signaling and the decision feedback equalizer circuit 300 for PAM-3 or duo-binary signaling.

FIG. 1 is a block diagram illustrating a PAM-3 signaling device 100, according to an embodiment of the inventive concept. The PAM-3 signaling device 100 according to an embodiment of the inventive concept supports single-ended PAM-3 signaling.

Referring to FIG. 1, the PAM-3 signaling device 100 includes an encoder 10 and an output driver 20.

The encoder 10 selects one of the first to ninth transitions in the first and second UIs that are successive and maps data of three bits using the remaining eight transitions other than one selected among the first to ninth transitions. Herein, UI refers to the minimum bit pulse width, which meaningful data has, in the transmission signal. For example, 1 bit may be transmitted during 1 UI in PAM-2; on the other hand, 2 bits may be transmitted during 1 UI in PAM-4. In an embodiment of the inventive concept, the encoder 10 may encode three bits, using 8 transitions such that three bits are capable of being transmitted during two UIs.

The output driver 20 receives the output signal of the encoder 10 and generates a multi-level signal having an output voltage of the first to third levels. The output driver 20 according to an embodiment of the inventive concept may generate a 3-level multi-level signal.

The data of three bits entered into the encoder 10 may be transmitted to a receiver terminal through a multi-level signal having the output voltage of the first to third levels during the first and second UIs that are successive.

The PAM-3 signaling device 100 according to an embodiment of the inventive concept may effectively transmit three bits during two UIs. Accordingly, it is possible to implement the efficiency to transmit 1.5 bits during one UI. Because one transition is not used for encoding as only eight of the nine transitions is used for encoding, it is possible to detect an error at the receiver terminal.

Moreover, the bandwidth for each channel may be improved by 50% compared with NRZ signaling and the clock frequency may be reduced by 33% compared with NRZ signaling based on the same bandwidth, by providing PAM-3 signaling capable of being applied to single-ended memory interface.

In the meantime, the above-described content is exemplary, and the encoder 10 and the driver 20 may be used for a memory interface. In this case, the PAM-3 signaling device 100 according to an embodiment of the inventive concept may further include a volatile memory and/or a nonvolatile memory. According to an embodiment, the PAM-3 signaling device 100 may include Double Data Rate (DDR) Synchronous Dynamic Random Access Memory (SDRAM), Low Power Double Data Rate4 (LPDDR4) SDRAM, Graphics Double Data Rate (GDDR) SDRAM, Low Power DDR (LPDDR), Rambus Dynamic Random Access Memory (RDRAM), or FLASH Memory.

FIGS. 2A and 2B are views illustrating an example of input data of the encoder 10 and the transition mapping result according to the input data, according to an embodiment of the inventive concept.

As illustrated in FIG. 2A, the output voltage of a multi-level signal generated by the output driver 20 may have first to third levels such as a low level, a middle level, and a high level.

Furthermore, the first to ninth transitions are composed of nine combinations of the first to third levels in the first UI and the first to third levels in the second UI.

Referring to FIGS. 2A and 2B, the encoder 10 selects one of the first to ninth transitions in the first and second UIs that are successive; and the selected one transition is not used for data mapping. The one transition not used for encoding is used to detect an error at a receiver terminal.

In the case of using 2 UIs, the windowing phenomenon may occur due to the shift of one UI. In this case, one transition, which is selected by the encoder 10, from among the first to ninth transitions may be used to detect the windowing phenomenon at the receiver terminal receiving a multi-level signal.

For example, when the signal corresponding to one transition selected among the first to ninth transitions is detected at the receiver terminal, it may be determined that the windowing phenomenon occurs.

The encoder 10 according to an embodiment of the inventive concept may select one, which is not used for encoding, from among the first to ninth transitions based on the circuit characteristics of the output driver 20, the characteristics of the channel through which the multi-level signal is transmitted, the pattern of data of three bits, and the like.

Referring to FIG. 2A, the encoder 10 may select a transition (hereinafter referred to as "H2H transition") having the third level (i.e., high level) in both the first UI and the second UI, from the first to ninth transitions. In this case, the total power consumption may be reduced by mapping the data of three bits other than H2H transition having the highest power consumption of the output driver 20.

Referring to FIG. 2B, the encoder 10 may select a transition (hereinafter referred to as "L2H transition") from the first level (i.e., low level) in the first UI to the third level (i.e., high level) among the first to ninth transitions. When a pulling-up operation is slower than a pulling-down operation depending on the characteristics of the output driver 20, the L2H transition is more likely to generate an error at the receiver terminal. For example, when the structure of NMOS over NMOS is used, the pulling-up operation may be slower than the pulling-down operation. In this case, the probability that an error occurs at the receiver terminal may be reduced by mapping data other than L2H transition.

FIG. 2C is an eye-diagram of PAM-3 data associated with the embodiment of FIG. 2B.

In an embodiment, as illustrated in FIG. 2B, when the data other than L2H transition is mapped, additional vertical eye and horizontal eye for the eye displayed as '2)' and '3)' in FIG. 2C may be secured to improve the voltage margin, and thus the bit error rate (BER) may be improved.

Meanwhile, in the above description, an embodiment is exemplified as the encoder 10 selects H2H transition or L2H transition, the selected transition is used to detect the windowing phenomenon, or the like at a receiver terminal, and data mapping is performed using the remaining transitions. However, this is exemplary, and the spirit and scope of the inventive concept is not limited thereto. For example, the encoder 10 may select the transition from the third level to the first level, and those skilled in the art may select various transitions based on the circuit characteristics of the output driver 20, the characteristics of the channel through which a multi-level signal is transmitted, and the pattern of data of three bits.

According to an embodiment of the inventive concept, because the PAM-3 signaling device 100 may select one not used for data mapping depending on channel characteristics, characteristics of a driver circuit, data pattern, or the like, the PAM-3 signaling device 100 not only may make it possible to detect an error at the receiver terminal, but also may efficiently transmit three bits during two UIs. Accordingly, the BER may be reduced.

FIG. 3 is a view for describing an encoder 10_1 and an output driver 20, according to an embodiment of the inventive concept.

Referring to FIG. 3, after mapping data of three bits by using the remaining eight transitions other than the selected one transition, the encoder 10_1 according to an embodiment outputs the mapped result to first to fourth driver signal lines.

In FIG. 3, the first driver signal line is expressed as $V_H$; the second driver signal line is expressed as $V_L$; the third driver signal line is expressed as $V_{M\_H}$; and the fourth driver signal line is expressed as $V_{M\_L}$.

The output driver 20 may generate the multi-level signal having the output voltage of the first to third levels, based on signals input from the first to fourth driver signal lines of the encoder 10_1.

FIG. 4A is a view for describing an encoder 10_2 and an output driver 20, according to an embodiment of the inventive concept. The output driver 20 of FIG. 4A is similar to the output driver 20 of FIG. 3. Accordingly, the same or similar components will be described using the same or similar reference numeral, and the redundant description will be omitted below for the sake of brevity.

As illustrated in FIG. 4A, the PAM-3 signaling device 100 according to an embodiment may further include a multiplexer 30 electrically connected to the encoder 10_2 and the output driver 20.

As illustrated in FIG. 4A, the encoder 10_2 may receive data of three bits of A, B, and C.

After mapping the data of three bits by using the remaining eight transitions other than the selected one transition, the encoder 10_2 outputs the mapped result to the multiplexer 30 via the first to fourth driver signal lines. In FIG. 4B, the first signal line is expressed as $V_{HO}$; the second signal line is expressed as $V_{HE}$; the third signal line is expressed as $V_{LO}$; the fourth signal line is expressed as $V_{LE}$; the fifth signal line is expressed as $V_{M\_HO}$; the sixth signal line is expressed as $V_{M\_HE}$; the seventh signal line is expressed as $V_{M\_LO}$; the eighth signal line is expressed as $V_{M\_LE}$.

The multiplexer 30 selectively outputs four of the first to eighth signal lines at a half rate, as the first to fourth driver signal lines connected to the output driver 20.

FIG. 4B is a view for describing data mapping of the encoder 10_2, according to an embodiment of the inventive concept. There are various data mapping methods for encoding data of three bits as eight outputs. The mapping method according to an embodiment will be described below.

In FIG. 4B, the encoder 10_2 maps data of three bits other than H2H transition, which has the highest power consumption, from among the first to ninth transitions.

In FIG. 4B, input data Input Data is data of three bits input to the encoder 10_2. The transmitter terminal output TX Output indicates a multi-level signal, which is output by the output driver 20 and which has the output voltage of the first to third levels.

As illustrated in FIG. 4B, the multi-level signal having the output voltage of the first to third levels may have nine transitions in both the first UI ODD UI and the second UI EVEN UI that are successive.

In FIG. 4B, the encoder 10_2 maps the data to eight outputs respectively corresponding to the first to eighth signal lines, with respect to each input data. For example, with regard to 3-bit input data of '011', '1010' may be output to the first signal line $V_{HO}$, the third signal line $V_{LO}$, the fifth signal line $V_{M\_HO}$, and the seventh signal line $V_{M\_LO}$ and '0011' may be output to the second signal line $V_{HE}$, the fourth signal line $V_{LE}$, the sixth signal line $V_{M\_HE}$, and the eighth signal line $V_{M\_LE}$, and thus the mapping may be made.

As illustrated in FIG. 4A, the multiplexer 30 selects the first signal line $V_{HO}$, the third signal line $V_{LO}$, the fifth signal line $V_{M\_HO}$, and the seventh signal line $V_{M\_LO}$ in ODD UI based on a clock signal and then outputs the transmitter terminal output TX Output to the output driver 20; the multiplexer 30 selects the second signal line $V_{HE}$, the fourth signal line $V_{LE}$, the sixth signal line $V_{M\_HE}$, and the eighth signal line $V_{M\_LE}$ in EVEN UI and then outputs the transmitter terminal output TX Output to the output driver 20.

The encoding logic of the encoder 10_2 according to an embodiment of the inventive concept may be expressed as illustrated in Equation 1 below.

$$V_{HO}=BC \quad V_{M\_HO}=BC+\overline{V}_{HO}V_{LO}$$

$$V_{LO}=A(\overline{B}+\overline{C}) \quad V_{M\_LO}=A(\overline{B}+\overline{C})+\overline{V}_{HO}V_{LO}$$

$$V_{HE}=B\overline{C} \quad V_{M\_HE}=B\overline{C}+\overline{V}_{HE}V_{LE}$$

$$V_{LE}=C(A+\overline{B}) \quad V_{M\_LE}=C(A+\overline{B})+\overline{V}_{HE}V_{LE} \qquad \text{[Equation 1]}$$

However, Equation 1 is exemplary, and the embodiment according to the technical idea of the inventive concept is not limited thereto. That is, the PAM-3 signaling device 100 according to the technical idea of the inventive concept may use a variety of encoding logic circuits depending on requirements of a design.

FIG. 5A is a view illustrating a circuit of the output driver 20, according to an embodiment of the inventive concept.

The output driver 20 according to an embodiment of the inventive concept may include a first stage circuit unit 21 and a second stage circuit unit 22.

The first stage circuit unit 21 may include a first transistor electrically connecting between power VDD and the output terminal $OUT_{TX}$ in response to the signal of the first driver signal line $V_H$ and a second transistor electrically connecting between the output terminal $OUT_{TX}$ and ground in response to the signal of the second driver signal line $V_L$.

The second stage circuit unit 22 may include a third transistor electrically connecting between the power VDD and the output terminal $OUT_{TX}$ in response to the signal of the third driver signal line $V_{M\_H}$ and a fourth transistor electrically connecting between the output terminal $OUT_{TX}$ and the ground in response to the signal of the fourth driver signal line $V_{M\_L}$.

The first stage circuit unit 21 and the second stage circuit unit 22 may be electrically connected via the output terminal $OUT_{TX}$.

In an embodiment, the turn-on resistor of each of first to fourth transistors may be $2Z_0$. Herein, $Z_0$ is the characteristic impedance of the channel through which a multi-level signal is transmitted.

In the embodiment of FIG. 5A, the output driver 20 has been designed using, but is not limited to, the first to fourth transistors of NMOS.

For example, as illustrated in FIG. 5B, the output driver 20_2 may be designed through complementary Logic including a first stage circuit unit 21_1 and a second stage circuit unit using both NMOS and PMOS.

FIG. 6 is a view illustrating an output voltage according to an input of the output driver 20, according to an embodiment.

As illustrated in FIG. 6, the output driver 20 has the output voltage $OUT_{TX}$ of the first to three levels, depending on the input of the first to fourth driver signal lines. In FIG. 6, '0' corresponds to a first level, that is, a low level; 0.25VDD corresponds to a second level, that is, a middle level; 0.5VDD corresponds to a third level, that is, a high level. As illustrated in FIG. 6, the output driver 20 has one output voltage of the first to third levels depending on cases of three inputs.

Hereinafter, the operation and the output voltage of the driver 20 according to an input will be described in detail with reference to FIGS. 7 and 8.

FIG. 7 is a view for describing an operation of the output driver 20 according to an input.

FIG. 8 is a view for describing voltage distribution of the output driver 20 according to an input.

Referring to FIG. 7, the operation of the output driver 20 corresponding to the output voltage of high level 'H', the operation of the output driver 20 corresponding to the output voltage of high level 'M', and the operation of the output driver 20 corresponding to the output voltage of high level 'L' are illustrated.

Referring to FIG. 8, the voltage distribution according to the operation of the output driver 20 corresponding to the output voltage of high level 'H', the voltage distribution according to the operation of the output driver 20 corresponding to the output voltage of high level 'M', and the voltage distribution according to the operation of the output driver 20 corresponding to the output voltage of high level 'L' are illustrated.

First of all, when the voltage applied to the first to fourth driver signal lines corresponds to the case illustrated as 'H' of FIG. 7, the first and third transistors that are respectively connected to the first driver signal line $V_H$ and the third driver signal line $V_{M\_H}$ are turned on, and the second and fourth transistors that are respectively connected to the second driver signal line $V_L$ and the fourth driver signal line $V_{M\_L}$ are turned off.

In this case, as illustrated with 'H' of FIG. 8, the first and third transistors are turned on and then $Z_0$ is generated. The high level output voltage of 0.5VDD may be generated through voltage distribution with a termination resistor at the receiver terminal.

When the voltage applied to the first to fourth driver signal lines corresponds to the case illustrated as 'M' of FIG. 7, the third and fourth transistors that are respectively connected to the third driver signal line $V_{M\_H}$ and the fourth driver signal line $V_{M\_L}$ are turned on, and the first and second transistors that are respectively connected to the first driver signal line $V_H$ and the second driver signal line $V_L$ are turned off.

In this case, as illustrated with 'M' of FIG. 8, the third and fourth transistors are turned on and then $2Z_0$ is generated. The middle level output voltage of 0.25VDD may be generated through voltage distribution with a termination resistor at the receiver terminal.

When the voltage applied to the first to fourth driver signal lines corresponds to the case illustrated as 'L' of FIG. 7, the first and third transistors that are respectively connected to the second driver signal line $V_L$ and the fourth driver signal line $V_{M\_L}$ are turned on, and the second and fourth transistors that are respectively connected to the first driver signal line $V_H$ and the third driver signal line $V_{MH}$ are turned off.

In this case, as illustrated with 'L' of FIG. 8, the second and fourth transistors are turned on and then $Z_0$ is generated. The low level output voltage of 0VDD may be generated through voltage distribution with a termination resistor at the receiver terminal.

In an embodiment, when the characteristic impedance of a channel through which a multi-level signal output by the output driver 20 is transmitted is $Z_0$, the impedance at a point in time when the output terminal of the output driver is viewed from the channel identically remains as $Z_0$ in the output driver 20, under all input conditions of the signal entered from the first to fourth driver signal lines.

FIG. 9 is a view illustrating impedance matching of the output driver 20.

Hereinafter, the impedance matching of the output driver 20 will be described in detail with reference to FIG. 9.

Referring to FIG. 9, the impedance matching of the output driver 20 corresponding to the output voltage of high level 'H', the impedance matching of the output driver 20 corresponding to the output voltage of high level and the impedance matching of the output driver 20 corresponding to the output voltage of high level 'L' are illustrated.

As illustrated with 'H' of FIG. 9, that is, in the case where the output driver 20 has the high level output voltage of 0.5VDD, when the transmitter terminal is viewed from the channel, the output driver 20 satisfies the impedance matching condition because the output driver 20 has the impedance corresponding to $Z_0$.

Continuing to refer to the case illustrated with 'M' of FIG. 9, even when the output driver 20 has the middle level output voltage of 0.25VDD, when the transmitter terminal is viewed from the channel, the output driver 20 satisfies the impedance matching condition because the output driver 20 has the impedance corresponding to $Z_0$.

Continuing to refer to the case illustrated with 'L' of FIG. 9, even when the output driver 20 has the low level output voltage of 0VDD, when the transmitter terminal is viewed from the channel, the output driver 20 satisfies the impedance matching condition because the output driver 20 has the impedance corresponding to $Z_0$.

The output driver 20 according to the technical idea of the inventive concept may ensure signal integrity, because the output driver 20 maintains impedance matching characteristics under all input conditions of the signal input from the first to fourth driver signal lines.

Hereinafter, according to an embodiment of the inventive concept, the configuration for detecting an error at the receiver terminal by using the multi-level signal generated by the PAM-3 signaling device 100 will be described.

The receiver terminal receiving the multi-level signal generated by the PAM-3 signaling device 100 is a device that recovers the received signal to the original signal by demodulating and decoding the received signal.

Because 2UI is used in PAM3 signaling, a windowing phenomenon may occur due to 1UI shift. As described with reference to FIGS. 2A and 2B, the PAM-3 signaling device 100 may select one of the first to ninth transitions during the first and second UI that are successive; and the selected one transition may not be used for data mapping but may be used to detect an error such as a windowing phenomenon at the receiver terminal.

FIG. 10 is a view illustrating how a multi-level signal generated by the PAM-3 signaling device 100 is recovered at a receiver terminal, according to an embodiment of the inventive concept.

Referring to FIG. 10, the multi-level signal output by the PAM-3 signaling device 100 is recovered to original 3-bit data (A, B, and C) at the receiver terminal through demodulation.

When the signal corresponding to one transition selected among the first to ninth transitions is detected, the receiver terminal may determine that the windowing phenomenon occurs.

FIGS. 11A and 11B are views for describing how a windowing phenomenon is resolved at a receiver terminal.

In an embodiment of the inventive concept, when a signal corresponding to the one transition selected among the first to ninth transitions is detected from the signal recovered at the receiver terminal, the correct decoding operation is performed by inverting the phase of the sampling clock by 180 degrees. Accordingly, the windowing phenomenon may be resolved.

Hereinafter, a configuration of resolving the windowing phenomenon at the receiver terminal will be described with reference to FIGS. 11A and 11B.

In an embodiment, the original signal of three bits may be recovered at the receiver terminal through four half-rate reference comparators and the decoding logic of a decoder.

As illustrated in FIG. 11A, four half-rate reference comparators may correspond to a first comparator Comp_$H_{ODD}$, a second comparator Comp_$L_{ODD}$, a third comparator Comp_$H_{EVEN}$, and a fourth comparator Comp_$L_{EVEN}$, which are illustrated in FIG. 11A. In the case of a half rate, the first and second comparators and the third and fourth comparators perform a comparison operation with clocks having a phase difference of 180 degrees.

As illustrated in FIG. 11B, the outputs of four half-rate reference comparators have a phase difference of 180 degrees, and the phase difference of 180 degrees corresponds to the difference of one UI.

In an embodiment, when the signal of the selected transition, which is not used for encoding, is detected, the receiver terminal may determine that a malfunction occurs because ODD and EVEN signals are sampled at phases opposite to each other, and then inverts the sampling clock phase by 180 degrees with the first to fourth comparators, thereby resolving the windowing phenomenon.

Hereinafter, the decoding operation of the receiver terminal according to an embodiment of the inventive concept will be described.

As illustrated in FIG. 11B, the output values of the first to fourth comparators are sampled at a specific timing and then are used to decode data. Because the clock signal needs to be sampled with a timing margin during the valid data interval upon sampling data, the clock signal is delayed through the inverter circuit during a specific time.

The decoding logic of the receiver terminal according to an embodiment may be expressed as illustrated in Equation 2 below.

$$A = \text{Comp\_}H_{ODD} \cdot \overline{\text{Comp\_}L_{EVEN}} + \text{Comp\_}L_{ODD}$$

$$B = \text{Comp\_}H_{ODD} + \text{Comp\_}H_{EVEN}$$

$$C = \text{Comp\_}H_{ODD} + \overline{\text{Comp\_}L_{EVEN}} \quad \text{[Equation 2]}$$

However, Equation 2 is exemplary, and the embodiment according to the technical idea of the inventive concept is not limited thereto. That is, the receiver terminal receiving a multi-level signal generated by the PAM-3 signaling device 100 according to the technical idea of the inventive concept may use a variety of decoding logic circuits depending on requirements of a design.

As such, when a signal corresponding to the one transition selected among the first to ninth transitions is detected, the PAM-3 signaling device 100 according to the technical idea of the inventive concept may allow the receiver terminal to perform the correct decoding operation by inverting the phase of the sampling clock by 180 degrees, thereby resolving the windowing phenomenon.

FIG. 12 illustrates a PAM-3 signaling method, according to an embodiment of the inventive concept. The PAM-3 signaling method according to an embodiment of the inventive concept may be performed by the PAM-3 signaling device 100 illustrated in FIGS. 1 to 9.

In operation S10, one is selected from the first to ninth transitions during the first and second UIs. Operation S10 may be performed by the encoder 10 of FIG. 1.

In operation S20, data of three bits is mapped using the remaining eight transitions other than the one selected among the first to ninth transitions. Operation S20 may be performed by the encoder 10 of FIG. 1.

In operation S30, the result of mapping data of three bits is received via an input and then the multi-level signal having the output voltage of the first to third levels is generated. Operation S30 may be performed by the output driver 20 of FIG. 1.

In operation S40, the signal is recovered at the receiver terminal receiving the multi-level signal. In an embodiment, as described with reference to FIGS. 10 and 11, the receiver terminal recovers the received multi-level signal through a comparator and decoding logic.

In operation S50, it is determined that a signal corresponding to the selected one transition is detected, at the receiver terminal.

When the signal is detected, in operation S60, the receiver terminal may invert the phase of data sampling clock by 180 degrees.

Hereinafter, according to another embodiment of the inventive concept, the decision feedback equalizer circuit 300 for PAM-N signaling will be described. For the purpose of clearly understanding the decision feedback equalizer circuit 300, the general decision feedback equalizer (DFE) will be described with reference to FIGS. 13 and 14.

FIG. 13 illustrates the structure of a general decision feedback equalizer (DFE).

As illustrated in FIG. 13, the general DFE 1 feeds back the signal in which a channel is attenuated, to a summer through a slicer and a digital filter and removes a post-cursor. The DFE 1 may be designed while changing the number of stages and the coefficient of the digital filters depending on the degree of channel attenuation.

FIG. 14 is a view for describing the channel attenuation compensation effect of DFE.

As illustrated in FIG. 14, the DFE 1 may compensate for the signal to be recovered to the values of 0 and 1 based on the sampling clock in terms of the receiver terminal.

FIG. 15 illustrates a DFE circuit associated with another embodiment of the inventive concept.

As illustrated in FIG. 15, a DFE circuit 300 may include a main tap circuit unit 310, a first tap circuit unit 320, and a two-stage comparator 330. The DFE circuit 300 refers to a circuit for PAM-3 or duo-binary signaling. The configuration of the DFE circuit 300 itself may be the same as a summer circuit for NRZ signaling.

The main tap circuit unit 310 receives an input signal. The input signal is PAM-3 data in which the high-frequency component is attenuated, and the main tap circuit unit 310 may amplify the received input signal.

FIG. 16 is an eye-diagram of PAM-3 data in which a high-frequency component input to a DFE circuit associated with another embodiment of the inventive concept is attenuated.

The eye (high) and eye (low) of the input data have a very small voltage margin for determining H (high), M (middle), and L (low) due to the attenuated component. Accordingly, this may be compensated through the first tap circuit unit 320. The components are mainly generated by post cursor components.

The first tap circuit unit 320 receives the output value of the two-stage comparator 330 via an input. The output value of the two-stage comparator 330 is the output value of each of the first comparator 331 and the second comparator 332. The first comparator 331 compares the input value with an upper reference value to generate the output value; the second comparator 332 compares the input value with a lower reference value to generate the output value.

FIG. 17 is a view for describing the boundary voltage of the PAM-3 signal associated with another embodiment of the inventive concept and the digital output of a two-stage comparator.

As illustrated in FIG. 17, one in the two-stage comparator performs the comparison with the upper reference value and then derives the result as an output value COMP_H; the other performs the comparison with the lower reference value and then derives the result as an output value COMP_L.

However, the output value of the first comparator 331 of FIG. 15 is Comp_HB, and the output value of the second comparator 332 is Comp_L. Assuming that the output value of the comparator 331 performing the comparison with the upper reference value is COMP_H, COMP_HB is the BAR (differential value) of COMP_H. Accordingly, when COMP_H is '1', COMP_HB is '0'; when COMP_H is '0', COMP_HB is '1'. Furthermore, COMP_L is the output value of comparator 332 performing the comparison with the lower reference value.

Three data modulation levels may be expressed through one current branch by assigning the input value of the first tap circuit unit 320 in the above-described manner.

FIG. 18 is a view for describing an operation according to an input value of a DFE circuit associated with another embodiment of the inventive concept.

As illustrated in FIG. 18, each summer input value is generated depending on input data in the three manners.

When the values of Comp_HB and Comp_L are (0, 1) and (1, 0) that are expressed differentially from each other, an operation is performed such that current flows as much as the tail current source $I_B$ positioned at the bottom, like the conventional summer.

When both the value of Comp_HB and the value of Comp_L are '1', the operation of flowing the current corresponding to the value of the tail current source $I_B$ positioned at the bottom, in half into the input transistors on both sides is performed.

The DFE circuit 300 has three current levels of 0, $0.5I_B$, and $I_B$ based on one-side input transistor, and may express all of the data modulation levels of PAM-3 or duo-binary.

FIG. 19 is a table for describing an operation of a DFE circuit according to an output value of a comparator associated with another embodiment of the inventive concept.

As illustrated in FIG. 19, the first tap circuit unit 320 may generate three states by assigning Comp_HBvalue instead of Comp_H value and may perform an operation of removing post-cursor according to three input levels. When input data has a high value, the first tap circuit unit 320 may subtract the $I_B$ value as the compensation current; when the input data has a middle value, the first tap circuit unit 320 may subtract the $0.5I_B$ value as the compensation current; when the input data has a low value, the first tap circuit unit 320 does not flow current.

FIG. 20 illustrates an eye-diagram in which PAM-3 data where a channel is attenuated is compensated through a DFE circuit associated with another embodiment of the inventive concept.

As illustrated in FIG. 20, it may be determined that the attenuated PAM-3 data is compensated, through the DFE circuit 300.

As described above, a DFE, circuit according to another embodiment of the inventive concept may express three data modulation levels using only the same circuit as the DFE circuit used in NRZ, thereby reducing the complexity of the circuit.

According to another embodiment of the inventive concept, the load capacitance in the summer required for the DFE circuit may be reduced, thereby improving the bandwidth.

According to another embodiment of the inventive concept, the efficiency of the overall interfaces using PAM-3 or duo-binary may increase.

As described above, the inventive concept has been described with reference to illustrative drawings. However, the inventive concept is not limited to the embodiments and drawings disclosed in the specification, and it is obvious that various modifications is made by those skilled in the art within the scope of the technical idea of the inventive concept. In addition, even though the operation and effect according to the configuration of the inventive concept have not been explicitly described while the embodiment of the inventive concept is described, it should be appreciated that predictable effects need to be recognized by the corresponding configuration.

According to an embodiment of the inventive concept, a PAM-3 transceiver and an operation method thereof may efficiently transmit three bits during two UIs and may allow a windowing phenomenon to be detected at a receiver terminal. According to an embodiment, the impedance matching of the output driver may be made to ensure the integrity of a signal.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A Pulse Amplitude Modulation 3 (PAM-3) signaling device, the device comprising:
an encoder configured to:
select one of first to ninth transitions in first and second unit intervals that are successive,
map data of three bits by using the remaining eight transitions other than the one selected among the first to ninth transitions, and
after mapping the data of three bits, output the mapped result to a multiplexer electrically connected to the encoder via first to eighth signal lines, the multiplexer selectively outputting four of signals of the first to eighth signal lines at a half rate via first to fourth driver signal lines; and
an output driver configured to:
receive an output signal of the encoder via an input, and
generate a multi-level signal having an output voltage of first to third levels based on a signal input from the first to fourth driver signal lines connected to the multiplexer,
wherein the data of three bits is transmitted to a receiver terminal through the multi-level signal having the output voltage of the first to third levels during the first and second unit intervals that are successive.

2. The device of claim 1, wherein the one selected among the first to ninth transitions is used to detect a windowing phenomenon at the receiver terminal receiving the multi-level signal.

3. The device of claim 2, wherein the encoder selects the one of the first to ninth transitions, based on at least one of circuit characteristics of the output driver, characteristics of a channel through which the multi-level signal is transmitted, and a pattern of the data of three bits.

4. The device of claim 3, wherein the output voltage of the first to third levels of the multi-level signal correspond to a low level, a middle level, and a high level, respectively, and
wherein the first to ninth transitions are made using combination of the first to third levels in the first unit interval and the first to third levels in the second unit interval.

5. The device of claim 4, wherein the encoder is configured to:
select one transition from the first level in the first unit interval to the third level in the second unit interval among the first to ninth transitions; and
map the data of three bits, using the remaining eight transitions.

6. The device of claim 4, wherein the encoder is configured to:
select one transition having the third level during both the first and second unit intervals among the first to ninth transitions; and
map the data of three bits, using the remaining eight transitions.

7. The device of claim 4, wherein the encoder is configured to select a transition having a third level in both the first and second unit intervals from the first to ninth transitions.

8. The device of claim 7, wherein the output driver includes:
a first stage circuit unit including a first transistor electrically connected between a power supply and an output terminal in response to a signal of the first driver signal line and a second transistor electrically connected between the output terminal and a ground in response to a signal of the second driver signal line; and
a second stage circuit unit including a third transistor electrically connected between the power supply and the output terminal in response to a signal of the third driver signal line and a fourth transistor electrically connected between the output terminal and the ground in response to a signal of the fourth driver signal line,
wherein the first stage circuit unit and the second stage circuit unit are connected via the output terminal.

9. The device of claim 8, wherein all turn-on resistors of the first to fourth transistors are $2Z_0$,
wherein $Z_0$ is characteristic impedance of a channel through which the multi-level signal is transmitted, and
wherein impedance at a point in time when the output terminal of the output driver is viewed from the channel identically remains as $Z_O$ in the output driver, under all input conditions of a signal input from the first to fourth driver signal lines.

10. The device of claim 2, wherein the multi-level signal is recovered to an original 3-bit signal at the receiver terminal through decoding logic of four half-rate reference comparators and a decoder.

11. The device of claim 2, wherein the receiver terminal determines that a windowing phenomenon occurs when a signal corresponding to the one transition selected among the first to ninth transitions is detected.

12. A Pulse Amplitude Modulation 3 (PAM-3) system comprising a PAM-3 signaling device and a receiver terminal, the device comprising:
   an encoder configured to:
      select one of first to ninth transitions in first and second unit intervals that are successive,
      map data of three bits by using the remaining eight transitions other than the one selected among the first to ninth transitions; and
   an output driver configured to:
      receive an output signal of the encoder via an input,
      generate a multi-level signal having an output voltage of first to third levels,
   wherein the data of three bits are transmitted to the receiver terminal through the multi-level signal having the output voltage of the first to third levels during the first and second unit intervals that are successive,
   wherein the one selected among the first to ninth transitions is used to detect a windowing phenomenon at the receiver terminal receiving the multi-level signal,
   wherein the multi-level signal is recovered to an original 3-bit signal at the receiver terminal through decoding logic of four half-rate reference comparators and a decoder, and
   wherein the receiver terminal inverts sampling clock phases of the four comparators and the decoder by 180 degrees when a signal having the one transition selected among the first to ninth transitions is detected.

13. A pulse amplitude modulation-3 (PAM-3) signaling method, the method comprising:
   selecting, by an encoder, one of first to ninth transitions in first and second unit intervals that are successive;
   mapping, by the encoder, data of three bits by using the remaining eight transitions other than the one selected among the first to ninth transitions;
   after mapping the data of three bits, outputting the mapped result to a multiplexer electrically connected to the encoder via first to eighth signal lines, the multiplexer selectively outputting four of signals of the first to eighth signal lines at a half rate via first to fourth driver signal lines;
   receiving, by an output driver, a result of mapping the data of three bits via an input; and
   generating a multi-level signal having an output voltage of first to third levels based on a signal input from the first to fourth driver signal lines connected to the multiplexer,
   wherein the data of three bits is transmitted to a receiver terminal through the multi-level signal having the output voltage of the first to third levels during the first and second unit intervals that are successive.

14. The device of claim 1, wherein the output driver includes:
   a first stage circuit unit including:
      a first transistor electrically connected between a power supply and an output terminal in response to a signal of the first driver signal line of the first to fourth driver signal lines, and
      a second transistor electrically connected between the output terminal and a ground in response to a signal of the second driver signal line of the first to fourth driver signal lines; and
   a second stage circuit unit including:
      a third transistor electrically connected between the power supply and the output terminal in response to a signal of the third driver signal line of the first to fourth driver signal lines, and
      a fourth transistor electrically connected between the output terminal and the ground in response to a signal of the fourth driver signal line of the first to fourth driver signal lines,
   wherein the first stage circuit unit and the second stage circuit unit are connected via the output terminal.

* * * * *